INVENTOR
G. E. KERSEY
BY W. L. Keefauver
ATTORNEY

May 24, 1966 G. E. KERSEY 3,253,156

CONTROLLED MULTISTATE CIRCUITS

Filed Dec. 26, 1962 2 Sheets-Sheet 2

United States Patent Office 3,253,156

Patented May 24, 1966

3,253,156

CONTROLLED MULTISTATE CIRCUITS

George E. Kersey, Millington, N.J., assignor to Bell Telephone Laboratories, Incorporated, New York, N.Y., a corporation of New York Filed Dec. 26, 1962, Ser. No. 247,031
13 Claims. (Cl. 307—88.5)

This invention relates to multistate circuits, particularly to such circuits employing negative resistance devices.

A multistate circuit is characterized by plural states of equilibrium, at least one of which is stable. In response to an applied input signal the circuit switches from one signal state to another, where it remains either indefinitely or temporarily in dependence upon whether the other state is stable or unstable.

Because a negative resistance device has a region of discontinuity in its current-voltage characteristic, it is particularly suitable for multistate circuit operation. In the region of negative resistance, an increase in voltage is accompanied by a decrease in current rather than by an increase in current as is customarily the case. But, physically, a negative resistance region cannot extend indefinitely; and must be bounded by regions of positive resistance, which support various equilibrium signal states that are either stable or unstable. Thus an alternative signal state is attained whenever the operation of a negative resistance device undertakes a transition from one region of positive resistance to another through an intervening region of negative resistance.

The duration during which a multistate circuit remains in an alternative signal state depends upon its mode of control. If the alternative state is to be unstable, i.e., temporary, it is attained by virtue of an energy storage element operating in conjunction with the negative resistance device. The resulting multistate circuit is described as a monostable multivibrator since, although it has two equilibrium states, only one of them is stable. When the alternative state is itself stable a further transition is achieved in response to an ensuing input signal of appropriate polarity.

In any case, the presence of a negative resistance region assures that the transition from one state to another will take place rapidly, making negative resistance devices particularly suitable at high frequencies. On occasion it is advantageous to be able to control the duration and nature of an alternative stable state. One such occasion occurs where recurrent timing intervals established by a monostable multivibrator must be extended for the duration of an incoming signal that is late in arriving. Where the monostable multivibrator is operated in conjunction with slower acting equipment to register the occurrence of the input signal within the timing interval, it is desirable to be able to hold the multivibrator in its unstable state until the slower acting equipment has been able to operate.

Accordingly it is an object of the invention to control the stability of a multistate circuit. Another object is to render a monostable circuit controllably multistable. A related object is to render a monostable circuit multistable for the duration of an input signal. Still another object is to transform a monostable circuit into a bistable one.

To accomplish the foregoing and related objects the invention provides for controlling the negative resistance characteristic of a negative resistance device. Specifically, a switchable impedance element is connected to a negative resistance device so that the equivalent impedance at the terminals of the device is altered according to the condition of the switchable element. As a result, the load line presented by the other circuit components to the augmented current-voltage characteristic of the device variously intersects it under the control of the switchable element.

In one embodiment of the invention a shunt resistor that modifies the characteristic presented at the terminals of the negative resistance diode is controlled by a transistor switch. When the switch is operated the magnitude of the shunt resistance is reduced with an accompanying alteration in the equivalent characteristic at the external terminals of the diode. This alteration is evidenced by a diminution in the slope of the negative resistance region.

Consequently the intersection of a load line with the resulting characteristic depends upon the condition of the switch. Hence the circuit is readily converted from monostability to bistability by the operation of the switch. To establish timing intervals, the circuit includes an energy storage element and is rendered monostable by having the current-voltage characteristic of its negative resistance diode intersected in a region of positive resistance at a single point. Then a trigger signal carrying the operation into the negative resistance region of the diode produces a temporary transition to another region of the diode characteristic for a duration controlled by the energy storage device. But when the switch responds to an incoming signal by altering the characteristic, evidenced by an increased slope of the negative resistance region, so that the load line is intersected in a region of positive resistance as well, the circuit becomes bistable and remains so for the duration of the incoming signal.

Other aspects of the invention will become apparent after the consideration of several illustrative embodiments, taken in conjunction with the drawings in which.

Figure 1A:
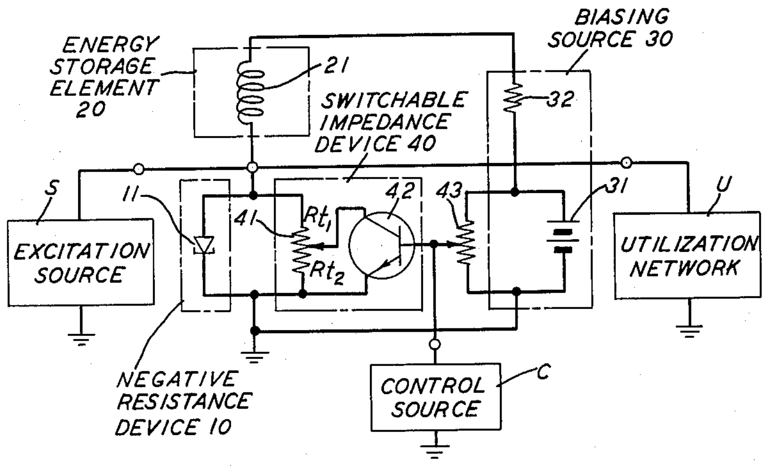
FIG. 1A is a schematic diagram of a controlled multistate circuit in accordance with the invention.

As shown interposed in FIG. 1A between an excitation source S and a utilization network U, one variety of multistate circuit employs a negative resistance device 10 in conjunction with an energy storage element 20 and a biasing source 30. Illustratively, the negative resistance device is a voltage-controlled diode 11 for which the energy storage element is desirably an inductor 21. The biasing source is constituted of a voltage source 31 connected in series with a resistor 32.

To control the stability of the circuit in FIG. 1A, the invention provides a switchable impedance device 40 whose setting, as determined by a control source C, regulates the effective current-voltage characteristic manifested at the external terminals of the diode 11. Advantageously constituting the switchable impedance device are a tapped resistor 41 and a switching transistor 42, both in shunt with the diode 11. The switching transistor is energized from the voltage source 31 through a voltage divider resistor 43.

Figure 1B:
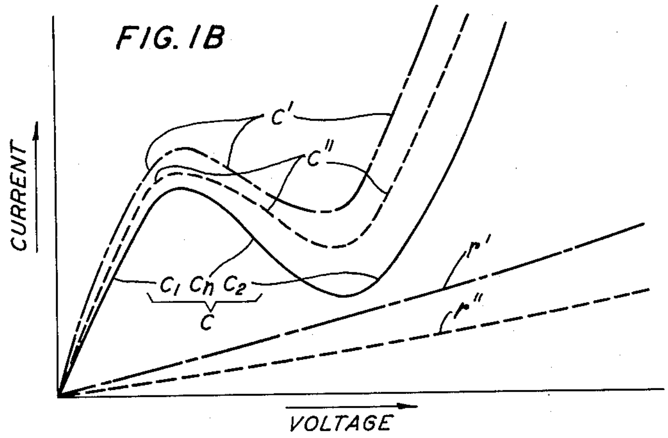
FIGS. 1B and 1C are graphical diagrams explanatory of the operation of the controlled circuit of FIG. 1.

Taken alone, the voltage-controlled diode 11 of FIG. 1A typically presents, at its external terminals, a current-voltage characteristic $c$ of the kind given in FIG. 1B. The characteristic is said to be voltage-controlled because it is single-valued in voltage but multi-valued in current. It has first and second regions $c_1$ and $c_2$ of positive resistance separated by an intervening region $c_n$ of negative resistance.

However, the effective characteristic presented to the remainder of the circuit at the terminals of the diode 11 becomes modified because of the switchable impedance device 40.

Within the switchable impedance device, the shunt resistor 41 is divided by its tap into portions having separate resistances $R_{t1}$ and $R_{t2}$. When taken with the diode characteristic *c*, the entire resistance $R_{t1}+R_{t2}$, as represented by the upper resistance characteristic *r'* of FIG. 1B, gives rise to a composite characteristic *c'* of FIG. 1B at the external terminals of the diode 11. On the assumption that the impedance of the utilization network is appreciably greater than that of the tapped resistor, the composite characteristic *c'* is a summation of the diode characteristic *c* with the resistance characteristic *r'*. Otherwise, the composite characteristic is modified to take account of the resistive effect of the utilization circuit.

As long as the entire resistance of the tapped resistor is greater than the minimum magnitude $|R_n|$ of the resistance presented by the diode in its negative resistance region, i.e., $R_{t1}+R_{t2}>|R_n|$, there will be a negative resistance region in the composite characteristic *c'* and the circuit in FIG. 1A will continue to have a multistate capability.

A different composite characteristic *c''* (FIG. 1B) is presented when only a portion of the tapped resistor 41, FIG. 1B, is effective with respect to the diode 11. The associate resistance $R_{t1}$ has a resistance characteristic *r''* which gives rise to an intermediate composite characteristic *c''*.

In the absence of a signal from the control source C, the voltage developed by the biasing source 31 at the divider resistor 43 is of a polarity that forward-biases the base-emitter region of the transistor 42, causing the impedance presented between the collector and emitter electrodes of the transistor to be substantially zero. Consequently, the upper characteristic *c'* of FIG. 1B, as redrawn in FIG. 1C, governs the operation of the circuit in FIG. 1A.

Figure 1C:
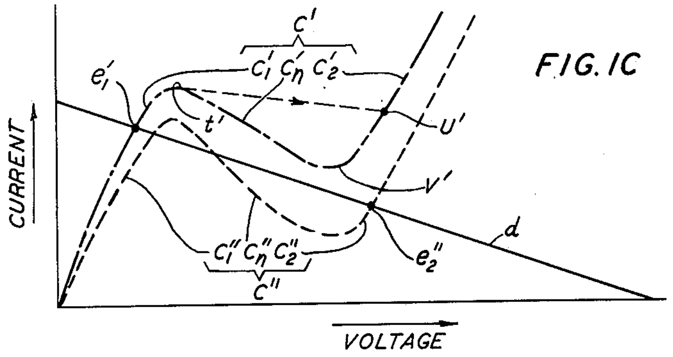

When the circuit is to be monostable with a single state of stable equilibrium but at least one alternative state of unstable equilibrium, the bias resistor 32 and the source 31 are proportioned to produce a load line *d* of FIG. 1C that intersects the upper characteristic *c'* at a single point *e'* of stable equilibrium. The latter condition is satisfied when the minimum resistive magnitude $|R_n'|$ in the negative resistance region of the upper characteristic *c'* is less than the resistance $R_b$ of the biasing resistor 32, i.e., $|R_n'|<R_b$.

When a trigger signal of sufficient amplitude is applied from the excitation source S, the operation of the circuit in FIG. 1A is carried beyond the threshold *t'* of the composite characteristic *c'*. Because the current flowing through the inductor, and hence the diode, cannot change instantaneously, switching takes place from the point *e'* of stable equilibrium in the first region *c'* of positive resistance to a point *u'* of unstable equilibrium in the second region $c_2'$ of positive resistance through the intervening region of negative resistance $c_n'$. The circuit is now in an unstable state, and the locus of operation begins to move downward to the valley point *v'* of the characteristic *c'*. Once the valley point *v'* is attained, a sudden, return transition of the operating locus takes place to the first region $c_1'$ of positive resistance, and the circuit returns to its stable state.

However, if while the locus of operation is in the second region $c_2'$ of positive resistance, i.e., the circuit is in its unstable state, a signal from the control source C is applied to turn "off" the transistor 42 by back-biasing its emitter-base region, the lower characteristic *c''* of FIG. 1C is presented at the external terminals of the diode 11. For this characteristic *c''*, the load line *d* intersects a second region $c_2''$, as well as a first region $c_1''$, of positive resistance, and the locus of operation, instead of returning to the equilibrium point *e'* of origin, moves to the alternate equilibrium point $e_2''$, where it remains until the control signal terminates.

Thus, the stability of the circuit in FIG. 1A is controlled by a switchable impedance element 40 that modifies the equivalent current-voltage characteristic presented at the external terminals of a negative resistance diode 11. As a result, a timing interval established by the circuit operating monostably can be extended by a control signal applied during the interval. It is to be noted that besides extending the timing interval, the control signal can be used for any desired interchange between the upper and lower characteristics *c'* and *c''* of FIG. 1C.

Figure 2:
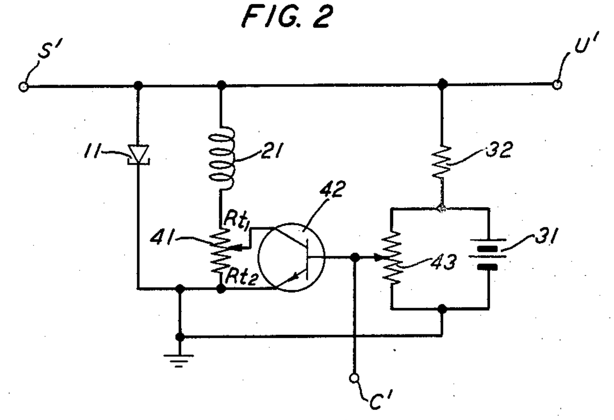
FIG. 2 is a schematic diagram of a controlled circuit that is alternative to that of FIG. 1.

A variant of the circuit in FIG. 1A is shown in FIG. 2, for which the inductor 21 is in shunt with the negative resistance diode 11, instead of being in series with it. In addition, the biasing resistor 32 and voltage source 31 are proportioned to provide a substantially constant current by having the resistance $R_b$ of the biasing resistor substantially greater than all of the other resistance confronting the source 31. Respective terminals S', C', and U' provide connections to supply and control sources and a utilisation network (not shown). Operationally, the circuit in FIG. 2 is similar to that of FIG. 1A. However, the circuit of FIG. 2 is advantageous with negative resistance diodes whose current-voltage thresholds are more accurately determined with respect to current than with respect to voltage.

Figure 3A:
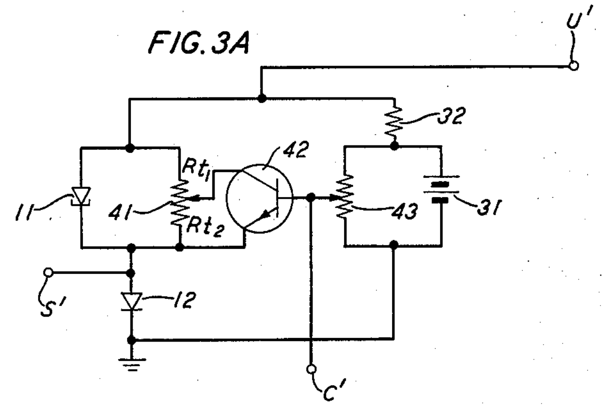
FIG. 3A is a schematic diagram of a holding AND gate in accordance with the invention.

Another embodiment of the invention, serving as a holding AND gate, is presented in FIG. 3A. The configuration of the holding AND gate is similar to that of the controlled circuits in FIGS. 1A and 2, aside from the omission of the inductor 21 and the inclusion of a rectifying diode 12 in series with the negative resistance diode 11. As before, the transistor 42 of FIG. 3A is ordinarily in its "on" condition, but the unbypassed resistance $R_{t1}$ of the tapped resistor 41 is so proportioned that the composite characteristic *c'* of FIG. 3B does not contain a region of negative resistance, i.e., $R_{t1}<|R_n|$, where $R_n$ is the minimum resistance of the diode 11 in the negative resistance region of its current-voltage characteristic. However, the remaining resistance $R_{t2}$ of the tapped resistor 41 is proportioned so that, when it acts in conjunction with the unbypassed resistance $R_{t1}$, a composite characteristic *c''* is provided which contains a region of negative resistance, i.e., $R_{t1}+R_{t2}>|R_n|$.

Figure 3B:
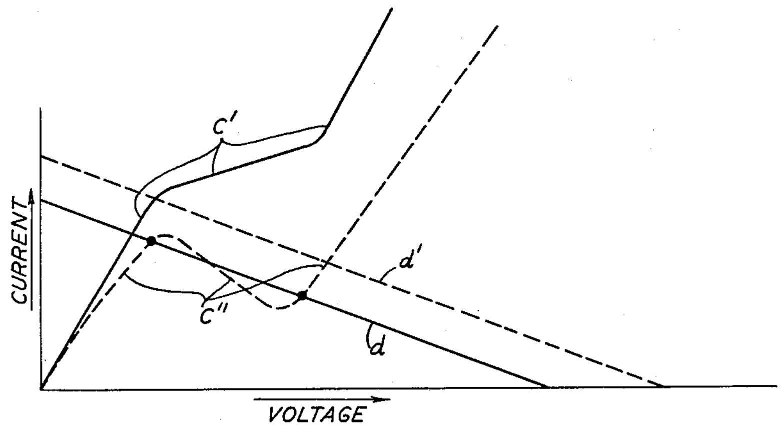
FIG. 3B is a graphical diagram explanatory of the operation of the holding AND gate of FIG. 3A.

Thus, if a signal is applied at the excitation source terminal S' to back-bias the rectifying diode 12 and there is no signal simultaneously present at the control terminal C', the circuit has a single stable state and the load line *d* of FIG. 3B is shifted upward without producing a significant change in voltage at the utilization network terminal U. Although such an excitation signal back biases the rectifying diode 12 and disrupts the pre-existing circuit path, an alternative circuit path is nonetheless completed through the source. But when a signal is applied to the control terminal C' to turn the transistor 42 "off" at the same time, or while a signal is present at the excitation source terminal S', switching takes place to a second region of positive resistance of the characteristic *c''*, where the circuit remains in a second state of stable equilibrium as long as the control terminal C' continues to be energized. Consequently, the circuit of FIG. 3A may be characterized as a holding AND gate since the presence of two signals is required to produce a significant output voltage which is thereafter held for the duration of one of them.

Other adaptations of the invention will occur to those skilled in the art.

What is claimed is:

1. In combination with a negative resistance diode having first and second terminals and energized by biasing means,
   - a variable impedance element interconnecting said terminals with each other and having a variable tap point,
   - and switching means interconnecting said tap point with one of said terminals and energized by said biasing means for substantially short-circuiting a portion of said variable impedance element.

2. A controlled multistage circuit comprising negative resistance means characterized by a current-voltage characteristic with a first region of positive resistance separated from a second region of positive resistance by an intervening region of negative resistance,
biasing means connected to said negative resistance means and presenting to said current-voltage characteristic a load line separately intersecting it in alternative positions of stable equilibrium in said first region of said positive resistance and said second region of positive resistance,
means connected in shunt with said negative resistance means for supplementing the resistance thereof to derive a current-voltage characteristic that is intersected by said load line at a single position of stable equilibrium,
and means connected to the supplementing means for controllably reducing the resistive supplementation of said negative resistance means to derive a current-voltage characteristic that is intersected by said load line at alternative positions of stable equilibrium, thereby to control the stability of said circuit.

3. A controlled-duration timing circuit comprising negative resistance means displaying a current-voltage characteristic with a region of negative resistance separated from respective regions of positive resistance at respective thresholds thereof,
means biasing said negative resistance means for monostable operation with respect to a stable signal state by having its load line intersect said characteristic in a positive resistance region thereof in the vicinity of one of its thresholds,
whereby an input signal carrying the operation of said negative resistance means beyond said one threshold causes the negative resistance means to switch to an unstable signal state,
and means connected to said negative resistance means for stabilizing said unstable signal state by having said load line intersect said characteristic in a positive resistance region thereof in the vicinity of another of said thresholds.

4. Apparatus comprising
a negative resistance device characterized by a current-voltage characteristic with a region of negative resistance between regions of positive resistance and having first and second terminals,
a resistor interconnecting said terminals with each other and having a tap point,
switching means, having a low resistance "on" condition and a high resistance "off" condition, interconnecting one of said terminals with said tap point,
means for energizing said negative resistance device and for turning said switching means "on,"
and means for applying an auxiliary signal to said switching means for turning it "off,"
thereby to controllably alter the resistance presented at the terminals of said device.

5. A controlled multistable circuit comprising negative resistance means having first and second terminals and characterized by a current-voltage characteristic with regions of positive resistance separated by an intervening region of negative resistance,
load and energizing means coupled to said negative resistance means and proportioned to present a load line intersecting said characteristic at a plurality of points representing positions of stable equilibrium in said regions of positive resistance,
first and second series-connected resistors interconnecting said terminals and proportioned to alter the current-voltage characteristic presented at said terminals so that said load line intersects the altered characteristic at a point representing a single position of stable equilibrium in a single region of positive resistance, switching means, having "on" and "off" conditions, interconnecting one of said terminals with the junction point of said series-connected resistors and turned "on" by said energizing means,
thereby to render said circuit monostable,
and means for applying an auxiliary signal to said switching means for turning it "off,"
thereby to render said circuit multistable.

6. A controlled circuit comprising
a negative resistance diode capable of adopting various signal states and having first and second terminals,
a resistor having first and second terminals and a variable-position tap,
the first and second terminals of said resistor being respectively connected to those of said diode,
a transistor having emitter, base and collector electrodes, said emitter and collector electrodes being respectively connected to one of said terminals and said tap,
and energizing means interconnecting said terminals with each other and energizing said transistor at its base electrode.

7. A holding AND gate comprising
apparatus as defined in claim 6 further including
a rectifying diode interconnecting said energizing means with one of said terminals,
whereby an input signal momentraily applied to said rectifying diode causes said negative resistance diode to adopt an alternative signal state for the duration of an input signal applied at the base electrode of said transistor.

8. A controlled-duration timing circuit comprising negative resistance means displaying a current-voltage characteristic with a region of negative resistance separated from respective regions of positive resistance at respective thersholds thereof, which negative resistance means comprises a negative resistance diode connected in shunt with a resistor having a variable tap point,
means biasing said negative resistance means for monostable operation with respect to a stable signal state by having its load line intersect said characteristic in the vicinity of one of its thresholds, whereby an input signal carrying the operation of said negative resistance means beyond said one threshold causes the negative resistance means to switch to an unstable signal state,
and switching means interconnecting the variable tap point of said negative resistance means with one of said terminals for altering said characteristic to produce a second state of stable equilibrium at the signal level where said circuit is otherwise in said unstable signal state.

9. A controlled-duration timing circuit comprising negative resistance means displaying a current-voltage characteristic with a region of negative resistance separated from respective regions of positive resistance at respective thresholds thereof, which negative resistance means comprises a negative resistance diode connected in shunt with a resistor having a variable tap point,
means biasing said negative resistance means for monostable operation with respect to a stable signal state by having its load line intersect said characteristic in the vicinity of one of its thresholds, whereby an input signal carrying the operation of said negative resistance means beyond said one threshold causes the negative resistance means to switch to an unstable signal state,
and means connected to the variable tap point of said negative resistance means for altering said characteristic to produce a second state of stable equilibrium at the signal level where said circuit is otherwise in said unstable signal state, which altering means comprises a switching transistor connected to the biasing means.

10. A controlled circuit comprising a negative resistance diode capable of adopting various signal states and having first and second terminals, a resistor having first and second terminals and a variable-position tap, the first and second terminals of said resistor being respectively connected to those of said diode, a transistor having emitter, base and collector electrodes, said emitter and collector electrodes being respectively connected to one of said terminals and said tap, energizing means connected to one of said terminals and the base electrode of said transistor, and an inductor interconnecting the other of said terminals with said energizing means, whereby an input signal momentarily applied to said negative resistance diode causes it to adopt an alternative signal state for the duration of a control signal applied at the base electrode of said transistor.

11. A controlled circuit comprising a negative resistance diode capable of adopting various signal states and having first and second terminals, a resistor having first and second terminals and a variable-position tap, one terminal of said resistor being connected to one terminal of said diode, an inductor interconnecting the other terminal of said resistor with the other terminal of said negative resistance diode, a transistor having emitter, base and collector electrodes, said emitter and collector electrodes being respectively connected to one of said terminals and said tap, and energizing means interconnecting said terminals with each other and energizing said transistor at its base electrode.

12. Apparatus comprising means having first and second terminals and presenting therebetween a current-voltage characteristic with a region of negative resistance, an impedance element directly interconnecting said first and second terminals with each other and presenting therebetween resistance which modifies said current-voltage characteristic, and means, external to said impedance element, for abruptly switching the resistance presented at said terminals by said impedance element from one discrete magnitude to another.

13. Apparatus comprising a negative resistance device, a resistance element connected in shunt with said device and having a plurality of discretely different resistance conditions, means for biasing said device for monostable operation, and switching means connected to said resistance element for switching said element from one of said resistance conditions to another to cause said device to be biased for bistable operation.

References Cited by the Examiner

UNITED STATES PATENTS

| | | | |
|---|---|---|---|
| 3,056,065 | 9/1962 | Porterfield | 307—88.5 |
| 3,062,971 | 11/1962 | Wallace | 307—88.5 |
| 3,108,218 | 10/1963 | Butler et al. | 307—88.5 |

JOHN W. HUCKERT, *Primary Examiner.*

DAVID J. GALVIN, *Examiner.*

A. J. JAMES, *Assistant Examiner.*